United States Patent Office 3,175,974
Patented Mar. 30, 1965

3,175,974
MINERAL LUBRICATING OIL COMPOSITIONS
Charanjit Rai and John B. Braunwarth, Crystal Lake, Ill., assignors to The Pure Oil Company, Chicago, Ill., a corporation of Ohio
No Drawing. Filed Aug. 31, 1961, Ser. No. 135,154
3 Claims. (Cl. 252—47)

This invention relates to a new class of chemical compounds characterized as bis(2-benzothiazolyl)dialkyl sulfides. More particularly, this invention relates to the discovery that compounds characterized as bis-2(benzothiazolyl)dialkyl sulfides are effective oxidation and corrosion inhibitors.

It is known in the art that mercaptobenzothiazoles are antioxidants for highly refined oils. One derivative thereof, namely di(benzothiazolyl)disulfide is a particularly effective antioxidant. Also, mercaptoarylthiazoles are used in the art as corrosion inhibitors.

In a copending application Serial No. 116,934, filed June 14, 1961, there is described a series of new antioxidants comprising di(2 - benzothiazolyl)alkanes, and more particularly, compounds such as 1,1-bis(2-benzothiazolyl)methane and 1,8-bis(2-benzothiazolyl)octane. These compounds are useful for preventing the oxidative deterioration of liquid systems at elevated temperatures. The compounds of the present invention are sulfur analogues of the compounds in said copending application, and contrary to expectations, are oxidation and corrosion inhibitors.

Accordingly, it becomes a primary object of this invention to provide a new class of chemical compounds comprising bis(2-benzothiazolyl)dialkyl sulfides and derivatives thereof.

Another object of this invention is to provide oxidation inhibitors comprising bis(2-benzothiazolyl)dialkyl sulfides.

Another object of this invention is to provide compositions containing and processes employing oxidation inhibitors comprising bis(2-benzothiazolyl)dialkyl sulfides.

A further object of this invention is to provide corrosion-inhibiting compositions containing bis(2-benzothiazolyl)dialkyl sulfides.

These and further objects of this invention will be described or become apparent as the specification proceeds.

The new oxidation inhibitors of this invention are characterized by having a bis(2-benzothiazolyl)dialkyl sulfide nucleus and are represented by the formula

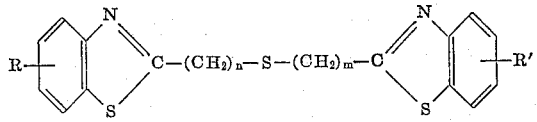

wherein $n$ and $m$ are the same or different integers from 1 to 12 and R and R' are hydrogen, or the same or different hydrocarbon radicals containing from 1 to 20 carbon atoms. R and R' can be hydrogen, or alkyl, aryl, aralkyl, alkaryl, cycloalkyl alkoxy or halo radicals, including methyl, ethyl, propyl, isopropyl, butyl, isobutyl, t-butyl, amyl, isoamyl, t-amyl, hexyl, isohexyl, heptyl, isoheptyl, octyl, isooctyl, nonyl, isononyl, decyl, undecyl, dodecyl, tridecyl, tetradecyl, pentadecyl, hexadecyl, heptadecyl, octadecyl, nonadecyl, and eicosyl radicals in the aliphatic series. The aryl groups include phenyl, naphthyl, and biphenyl; the aralkyl groups include benzyl, phenylethyl, etc.; the alkaryl groups include tolyl, xylyl and the like; the cycloalkyl radicals may be cyclopropyl, cyclobutyl, cyclopentyl, and cyclohexyl radicals; the alkoxy radicals include methoxy, ethoxy, hexoxy; and the halo radicals include chloro and bromo.

Species of compounds coming within the foregoing definition are:

1,1'-bis(2-benzothiazolyl)dimethyl sulfide
2,2'-bis(2-benzothiazolyl)diethyl sulfide
3,3'-bis(2-benzothiazolyl)dipropyl sulfide
4,4'-bis(2-benzothiazolyl)dibutyl sulfide
5,5'-bis(2-benzothiazolyl)dipentyl sulfide
6,6'-bis(2-benzothiazolyl)dihexyl sulfide
7,7'-bis(2-benzothiazolyl)diheptyl sulfide
8,8'-bis(2-benzothiazolyl)dioctyl sulfide
4,4'-dimethyl-1,1'-bis(2-benzothiazolyl)dimethyl sulfide
5,5'-diethyl-8,8'-bis(2-benzothiazolyl)dioctyl sulfide
6,6'-dieicosyl-20,20'-bis(2-benzothiazolyl)dieicosyl sulfide
4-isopropyl-5'-butyl-1,1'-bis(2-benzothiazolyl)dimethyl sulfide The compounds of this invention can be prepared by a number of different methods, including the condensation of an o-aminothiophenol with a dibasic thioalkyl acid in the presence of a catalyst such as a polyphosphoric acid. This reaction is illustrated by the following:

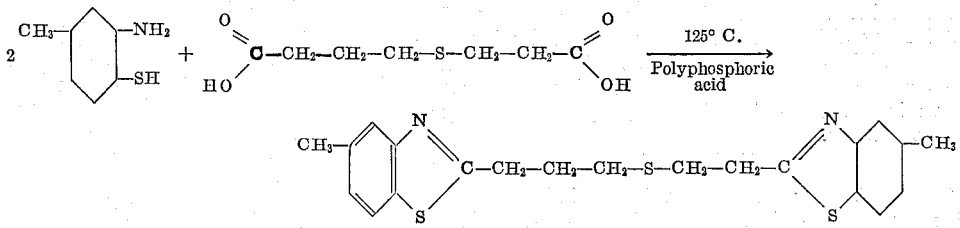

In order to illustrate but not limit the invention, the following examples are given.

EXAMPLE I

As a specific embodiment of this invention, 2,2'-di(benzothiazolyl)diethyl sulfide, was prepared by reacting 0.2 mole of o-aminothiophenol with 0.1 mole of 3,3'-thiodipropionic acid (ester or nitrile) in the presence of 150 g. of polyphosphoric acid, at a temperature of 125° C. The resulting intermediate product was decomposed with ice, and washed with water, sodium bicarbonate solution, and water. The resulting, raw product was crystallized from alcohol. The purified product had a melting point of 158.5° C., and its structure was as follows:

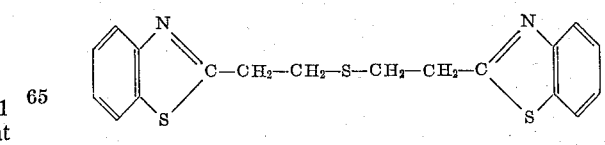

The effectiveness of this compound as a corrosion inhibitor was demonstrated by subjecting several samples containing well known and effective corrosion inhibitors and also samples containing the compound of Example I to the bulk oil oxidation test. The results are as follows:

Table I
BULK OIL OXIDATION TEST—EFFECT OF ADDITIVES ON METAL CORROSION

| Additive in Primol D, 1 wt. Percent | Percent Increase in Viscosity at 100° F. after Test | Weight Loss of Metal Strip (mg./cm.²) | | |
|---|---|---|---|---|
| | | Aluminum | Copper | Steel |
| Compound "A" | 80 | | | |
| Compound "B" | 25 | 0.055 | 0.011 | 0.050 |
| Compound "C" | 29 | 0.015 | 0.017 | 0.020 |
| Compound "D" | 25 | 0.008 | 0.023 | 0.005 |
| Phenyl-napththylamine | 19 | 0.054 | 0.145 | 0.069 |
| 2,2'-bis(2-benzothiazolyl)-ethyl sulfide | 35 | 0.015 | 0.014 | 0.016 |
| | 36 | 0.006 | 0.003 | 0.005 |

Primol D is a proprietary name for a super refined oil of naphthenic character having the following characteristics: Sp. gr. of 28.3; flash, °F. of 430; fire, °F. of 495; vis. @ 0°F. at 60,000 S.U.S.; vis. @ 100°F. of 366.7 S.U.S.; vis. @ 130°F. of 164.9 S.U.S.; vis. @ 210°F. of 53.5 S.U.S.; Saybolt color of +30; pour, °F. of −25; av. mol. wt. of 430; C.R. of 0.3; VI of 77; percent sulfur less than 0.05; neut. No. (1948) less than 0.03; N wt. percent—less than 0.02; C wt. percent—86.2; H wt. percent—13.6, prepared from naphthenic crude sources and refined by repeated $H_2SO_4$ treatment and/or drastic hydrogenation. This oil is merely illustrative, and other fluid systems, such as lubricating oils generally, waxes, emulsions, cutting oils, gear oils, greases, polish compositions, reaction systems, water purification systems and the like can be benefited by incorporation of the compounds of this invention.

The Bulk Oil oxidation test is Method 5308.4 of Central Test Method Standard No. 791, dated December 15, 1955, entitled "Corrosiveness and Oxidation Stability of Light Oils" (metal strips). Since this method is a standard corrosiveness and oxidation stability test known in the art, it is only necessary to refer to the method number.

EXAMPLE II

About 0.2 mole of 2-amino-4-methylthiophenol and 0.1 mole of 4,4'-thiodibutyric acid are reacted in the presence of 150 g. of polyphosphoric acid at about 130° C. for two hours. The reaction mixture is decomposed by the addition of crushed ice and the resulting organic phase is washed with water, sodium bicarbonate solution, and finally with water again. The product is taken up in alcohol and crystallized therefrom. The product (in partially purified form) has the following structure:

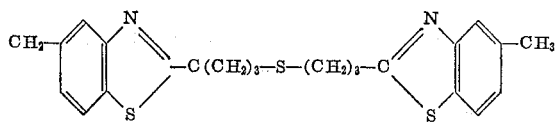

EXAMPLE III

About 0.3 mole of 2-amino-4-chlorothiophenol and about 0.15 mole of 5.5'-thiodipentanoic acid are reacted under the conditions of Example I to form 3,3-dichloro-4,4'-di(2-benzothiazolyl)dibutyl sulfide.

The compounds of this invention may be used singly, or in mixture in liquid or solid systems at low concentrations, preferably within the range of about 0.1 to 3.0% by wt. for service under conditions wherein it is desired to inhibit oxidation. The liquid or solid system may comprise any system used under conditions where it is desired to inhibit oxidation, and in which a small but effective quantity of the compounds of this invention can be incorporated. The compounds of this invention are generally water-insoluble, but are soluble in organic solvents, hydrocarbons, mineral oils, synthetic lubricants and rubber. Accordingly, the compounds of this invention can be incorporated in water systems by the addition of an emulsifier or carrier liquid which is water-soluble or water-miscible. A particular application would be the use in a solid or semi-solid system, such as plastics or rubber, wherein it is desired to inhibit oxidation. Another application would be in testing the effectiveness of oxidation inhibitors wherein the compounds of this invention may be used to offset the negative catalytic action of the inhibitors.

The polyphosphoric acid used as a catalyst in preparing the compounds of this invention comprise solutions of phosphorus pentoxide in phosphoric acid. These solutions generally contain about 85% by wt. of phosphorus pentoxide in the phosphoric acid, and the particular acid used to illustrate this invention contained this amount of phosphorus pentoxide. Other polyphosphoric acids containing between about 60 to 90% of phosphorus pentoxide in phosphoric acid may be used as the catalyst or hydrochloric acid may be used. Since the general nature of this reaction and the manipulations for conducting same are known, no further explanation is necessary. The product of the reaction is a solid and is readily separated by water dilution or other known techniques.

Having thus described the invention, the only limitations attaching thereto appear in the appended claims.

The embodiments of the invention in which an exclusive property or privilege is claimed are defined as follows:

1. A mineral lubricating oil composition comprising a major portion of mineral lubricating oil and about 0.1 to 3.0 wt. percent of an antioxidant of the formula

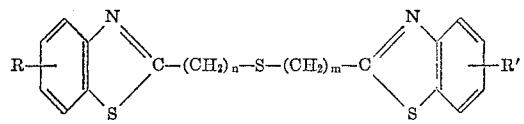

wherein $n$ has a value of 1 to 12, $m$ has a value of 1 to 12, and R and R' are substituents of the group consisting of hydrogen, $C_1$-$C_{20}$ alkyl, phenyl, naphthyl, biphenyl, benzyl, phenylethyl, tolyl, xylyl, cyclopropyl, cyclobutyl, cyclopentyl, cyclohexyl, methoxy, ethoxy, hexoxy, chloro and bromo.

2. A mineral lubricating oil composition consisting essentially of a major portion of a mineral lubricating oil and about 0.1 to 3.0 wt. percent of 2,2'-bis(2-benzothiazolyl) diethyl sulfide.

3. A mineral lubricating oil composition consisting essentially of a major portion of a mineral lubricating oil and about 0.1 to 3.0 wt. percent of 3,3'-bis(2-benzothiazolyl) dipropyl sulfide.

References Cited by the Examiner

UNITED STATES PATENTS

| 2,111,990 | 3/38 | Reed et al. | 44—63 |
| 2,154,097 | 4/39 | Loane | 252—391 |
| 2,218,283 | 10/40 | Fuller | 252—47 |
| 2,568,472 | 9/51 | Trautman | 252—33.6 |
| 2,942,003 | 6/60 | Copeland | 260—304 |
| 2,963,433 | 12/60 | Little et al. | 252—391 |
| 3,004,034 | 10/61 | D'Amico | 260—304 |

OTHER REFERENCES

Musgrave et al.: Chem. Abstracts, volume 50, column 1251c (1953).

Zubarovskii: Chem. Abstracts, volume 46, column 6641 (1952).

Chem. Abstracts: 5th Decennial Index, page 1800S (1960).

DANIEL E. WYMAN, Primary Examiner.

DUVAL T. McCUTCHEN, Examiner.

UNITED STATES PATENT OFFICE
CERTIFICATE OF CORRECTION

Patent No. 3,175,974                      March 30, 1965

Charanjit Rai et al.

It is hereby certified that error appears in the above numbered patent requiring correction and that the said Letters Patent should read as corrected below.

Column 3, lines 54 to 59, for that portion of the formula reading: $\diagdown\!\!\!-C(CH_2)_3-S$     read     $\diagdown\!\!\!C-(CH_2)_3-S$ column 3, line 62, for "5.5′-" read -- 5,5′- --.

Signed and sealed this 17th day of August 1965.

(SEAL)
Attest:

ERNEST W. SWIDER                      EDWARD J. BRENNER
Attesting Officer                       Commissioner of Patents